E. B. ALLEN.
MECHANICAL MOVEMENT.
APPLICATION FILED JUNE 17, 1915.
1,234,997.
Patented July 31, 1917.
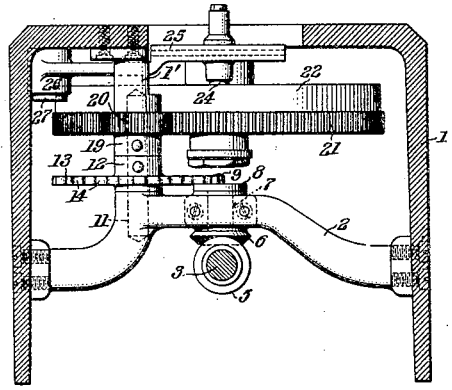
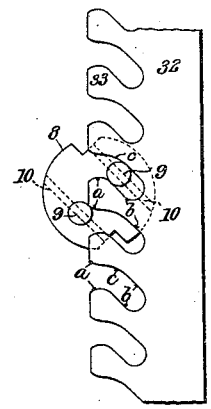
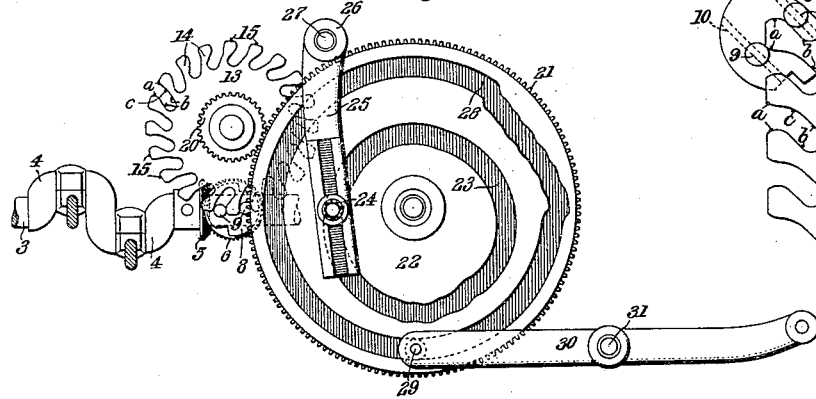
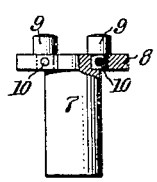
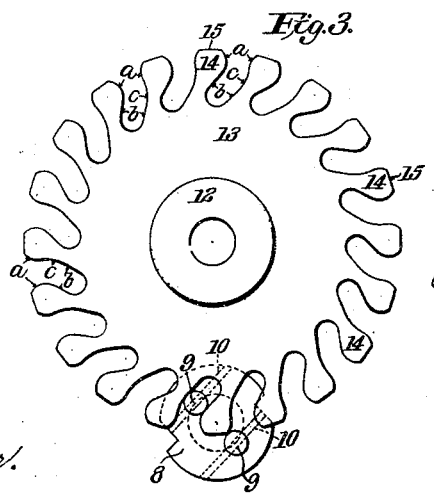
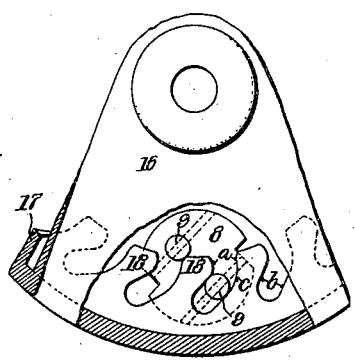
WITNESSES:
INVENTOR
Edward B. Allen
BY
Henry J. Miller
ATTORNEY

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

MECHANICAL MOVEMENT.

1,234,997.    Specification of Letters Patent.    Patented July 31, 1917.

Application filed June 17, 1915. Serial No. 34,601.

*To all whom it may concern:*

Be it known that I, EDWARD B. ALLEN, a citizen of the United States, residing at Bridgeport, in the county of Fairfield and State of Connecticut, have invented certain new and useful Improvements in Mechanical Movements, of which the following is a specification, reference being had therein to the accompanying drawings.

This invention relates to mechanism for producing interrupted or step-by-step motion, and it has for its object to provide mechanism of this description which shall be durable and noiseless when operated at high speeds and which shall be simple in construction and shall avoid harsh impact of its interengaging parts.

This object has been attained heretofore more or less imperfectly by the employment of a device known as the "Geneva" movement wherein a peripherally toothed driven member has been actuated by a continuously rotating driving member having one or more eccentrically disposed pins engaging the teeth of the driven member to impart thereto successive impulses with intermediate dwells, interengaging holding means being provided upon said members for maintaining the driven member stationary intermediate said impulses.

In its preferred form, the present improvement includes a rotary driving member and a driven member provided respectively with eccentrically disposed pins and series of teeth adapted for engagement thereby, the relation of said members and the form of the teeth being such that the actuating pins serve, not only to impart operative impulses to the driven member, but to positively hold the latter stationary throughout the period between such impulses.

In its more approved embodiment, the present invention comprises a continuously rotating driving disk having a plurality of eccentrically disposed pins and movable upon an axis disposed within the periphery of a driven wheel, disk or other member formed with a series of teeth each adapted for operative engagement by said pins and formed with diametrically opposite concentric portions adapted to assume concentric relation with the axis of movement of said driving member and with adjacent tangential active portions, the adjacent teeth being adapted for simultaneous engagement at opposite sides thereof by said pins during a portion of a rotation of the driving member.

The invention will be understood by reference to the accompanying drawings, in which Figure 1 is a transverse section of the base and a portion of the operative mechanism of a buttonhole sewing machine embodying the present improvement, and Fig. 2 is a plan of a portion of the feeding mechanism of said machine also showing the present improvement. Fig. 3 is a plan of the driving and driven members detached from the feeding mechanism, and Fig. 4 an elevation of the driving member. Figs. 5 and 6 are views similar to Fig. 3, representing alternative forms of the improvement.

As represented in Figs. 1 to 4 inclusive, the machine is constructed with the hollow base 1 provided with the transverse bearing member 2 beneath which extends the rotary main-shaft 3 which is shown provided with the cranks 4. Fixed upon the main-shaft is the bevel pinion 5 meshing with a similar pinion 6 which is secured upon the lower end of a short shaft 7 journaled in a suitable bearing of the frame-member 2 and provided at its upper end with the driving disk or member 8. Mounted upon the disk 8 are the diametrically opposite and eccentrically disposed cylindrical stud-pins or driving elements 9, each having its reduced lower portion inserted in an aperture of the disk in which it is secured by means of the cross-pin 10.

Fixed upon a shaft 11 journaled in a second bearing of the frame-member 2 and in a depending bearing member 1' of the base 1 is the hub 12 of the driven disk or member 13 which is provided with a circular series of teeth 14 extending around its periphery and adapted for engagement with the stud-pins 9. Each of these teeth has a substantially circular outer portion and a contracted inner portion, the center of the outer or dwell-producing portion being coincident with the axis of rotation of the shaft 7 when such tooth is in operative relation with both of the stud-pins 9.

One edge of each tooth has a straight inner or active portion *b* arranged in tangential relation with its circular outer portion *a* and inclined at an angle with a radial line passing through said tooth; and the adjacent edge of the next tooth has a straight inner portion parallel therewith and joined with its curved outer portion by an intermediate curved portion c concentric with the circular outer portion of said adjacent tooth. The spacing apart of the concentric and straight parallel portions of the adjacent teeth corresponds with the diameter of the stud-pins 9.

As illustrated in Figs. 2 and 3, the driving member 8 is designed to turn in clockwise direction, the stud-pin or driving element 9 at the left being the active agent in imparting a driving impulse to the driven member 13. As this stud-pin enters the outer concentric or dwell-producing portion of the cam-recess between the teeth 14, the other driving element is just emerging from the adjacent cam-recess, but still maintains contact relation with the outer portion of the intermediate tooth.

In the continued movement of the member 8, the left-hand stud-pin continues its advance within the cam-recess until it reaches the straight or active portion of such recess, at which instant the other stud-pin reaches the flattened peripheral portion 15 of the intervening tooth which is cut away for clearance for the advance of the until now stationary driven member. In the further movement of the left-hand stud-pin in its circular path it encounters the straight inclined active portion of the tooth which it engages and impels it in the same direction as it moves inwardly along such straight edge and backward to the point of tangency of the straight portion with the outer circular portion at which point in the rotation of the driving member the other stud-pin enters the adjacent cam-recess.

As the second of these stud-pins moves along the concentric portion of its respective cam-recess, the first remains in contact with the intermediate tooth 14 which is held locked against circular movement between the two stud-pins until the second of the latter reaches the straight inclined or active part of the cam-recess at which point the first of the stud-pins recedes from its respective tooth as previously described. It will thus be seen that the driving and driven elements 9 and 14 maintain constant driving relation between their respective supporting members so as to afford between the latter a positively acting connection which preserves predetermined relations between said members for all positions, such connection being permanent in that it remains uninterrupted and without lost motion between the interengaging parts while the driven member performs an excursion or cycle of movement from an initial position to its return to said position.

The operation above described is repeated for each semi-rotation of the driving member, which thus imparts to the driven member two advance impulses with intermediate dwells for every rotation. As will be observed, the period of dwell of the driven member is determined by the length of the circular arc of the outer portion of the tooth, and it evidently occupies an appreciable portion of a complete rotation of the driving member. While the mechanism is constructed for a rotation in the direction described above, it is found in practice that it will operate effectively when the driving member is turned in the reverse direction, the transmission of intermittent movement from the driving to the driven member being in any case effected entirely without impact or harsh engagement of the interengaging parts, and hence without noise even when driven at high speed.

As above described, the present improvement is embodied in mechanism comprising a driven member having peripheral teeth, but in the modification shown in Fig. 5, the driven member is in the form of an internal gear, the web 16 being formed with an offset inwardly extending rim 17 having in its inner edge the inwardly extending teeth 18 with circular end portions flattened at their extremities and straight inclined opposite end portions, the form of the teeth being the same as that represented in the other figures and coöperating precisely in the same manner with the driving elements 9 of the disk 8 as already described.

As represented in Figs. 1 and 2, the shaft 11 has fixed thereon above the driven member the hub 19 of a pinion 20 meshing with the peripheral gear-teeth 21 formed upon the rim of the feed-wheel 22 which is suitably journaled within the machine base 1. The feed-wheel 22 is shown formed in its upper face with the feed cam-groove 23 which is entered by a stud 24 depending from a lever 25 having a hub 26 fulcrumed at 27 upon the bed 1, and with a side-shift cam-groove 28 which is entered by a stud 29 upon one arm of a rock-lever 30 fulcrumed intermediate its ends at 31. The levers 25 and 30 are in practice connected with relatively sliding plates of which one sustains the work-holder deriving therefrom traveling movements relatively to suitable stitch-forming mechanism, as represented, for instance, in my Patent No. 1,039,241, of September 24, 1912.

One of the distinguishing characteristics of the present improvement as compared with previously devised mechanisms of this class is the compactness of the driving and controlling member in its restriction to simple combined driving and holding elements acting in conjunction with gear-teeth of special form, whereby the teeth of the driven member are adapted to be closely spaced, so that a moderate sized driven element may be constructed, when of circular form, with a comparatively large number of teeth and therefore adapted to receive a correspondingly large number of short step-by-step movements in performing a single rotation, this being a desideratum especially in connection with feeding mechanism of buttonhole sewing machines, wherein the feed-wheel is designed to perform only a single rotation in a cycle of operation including a large number of stitch-forming cycles each representing one rotation of the main or actuating shaft. This class of sewing machine requires that the feed be quick, noiseless, intermittent, without impact of its operative parts, and under positive control under all conditions so as to insure absolute precision. These requisites are attained by the employment of feed-actuating means embodying the present improvement as above described.

While, however, the present improvement is shown herein and is designed particularly for imparting to the feeding mechanism of a buttonhole sewing machine step-by-step operative movements, it is obviously adapted for use in connection with many other classes of mechanism, and is capable of considerable modification to satisfy the conditions of operation under which it may be employed.

In Fig. 6 the present invention is shown embodied in a rack-and-pinion device wherein the rectilinearly movable rack-bar 32 is provided with a straight series of teeth 33 formed similarly to the teeth 14 as represented in Figs. 1, 2 and 3. In this, as in the other forms of the improvement, the driving disk 8 has its axis of rotation within the path of movement of the rack-teeth 33, and is provided with the stud-pins 9 with the path of movement of which the circular portion of each rack-tooth in succession assumes concentric relation at the completion of each advance movement of the rack-bar.

In each form of the improvement shown and described herein the driving member 8 is designed to rotate, either continuously as in the forms represented in Figs. 1 to 5 inclusive, or reciprocally as in the form represented in Fig. 6. It is evident, however, that the driving member may be rotated continuously in the same direction or may be turned alternately in opposite directions, and that the driven member may be in the form of a rotary disk or member or a reciprocating bar, the characteristic feature of the improvement being the construction and operative relation of the interengaging elements of the driving and driven members whereby solely through the mutual coöperation of said elements successions of advance impulses in the same direction are produced with intermediate positively controlled dwells of substantial and predetermined duration.

Having thus set forth the nature of the invention, what I claim herein is:—

1. In a mechanical movement for obtaining intermittent motion, a driving element, a driven element, a pair of pin members carried by said driving element, complemental members carried by the driven element coacting with pin members and shaped to permit said pin members solely to impart driving impulses to said driven member succeeded by dwells and without lost motion.

2. In a mechanical movement for obtaining intermittent motion, a driving element, a driven element, pins being carried by the driving element, and coacting teeth carried by the driven element, said teeth being shaped to permit the pins to be engaged therewith without imparting movement for an appreciable interval to said driven member during said engagement.

3. In a mechanical movement device, a driven member comprising a series of teeth and a rotary driving member provided with a plurality of driving elements acting successively upon said teeth each to produce driving impulses and intermediate holding actions extending through a substantial portion of the rotation of the driving member.

4. In a mechanical movement device, a driven member having a series of teeth and a driving member provided with a plurality of similar successively acting driving elements, said teeth of the driven member being constantly in engagement with one or more of said driving elements, and said driving elements solely imparting motion to the driven member interrupted by positively controlled dwells of definite duration.

5. In a mechanical movement for obtaining intermittent motion, a rotating driving element and a driven element, said elements having coacting surfaces and said rotating driving element turning on an axis located between circles bounding the outer and inner extremities of the coacting surfaces of the driven element whereby in operation dwells precede the driving impulses imparted to the driven member.

6. In a mechanical movement device, the combination with a rotary driving member comprising a plurality of driving elements, of a driven member having a series of driven elements adapted for engagement with said driving elements and formed each with dwell-producing and active portions constantly in positive engagement with at least one of said driving elements whereby the driven member is alternately actuated and locked against rotary movement solely by action of said driving elements.

7. In a mechanical movement device, a driven member formed with a series of teeth and a continuously rotating driving member having its axis of movement within the range of movement of said teeth and provided with a plurality of driving elements intermeshing with said teeth and adapted to assume simultaneous operative relation with each of said teeth successively for an appreciable portion of a rotation of the driving member.

8. In a mechanical movement device, a driving member having a plurality of driving elements and a driven member formed with a series of teeth each adapted for operative engagement by said driving elements and formed with diametrically opposite concentric portions adapted to assume concentric relation with the axis of movement of and for simultaneous engagement by said driving elements.

9. In a mechanical movement device, a rotary driving disk provided with eccentrically disposed and diametrically opposite stud-pins and a driven wheel formed with peripheral teeth having a pitch corresponding with the spacing apart of said stud-pins and formed with diametrically opposite concentric portions adapted to assume concentric relation with the axis of movement of and for simultaneous engagement by said stud-pins.

10. In a mechanical movement for obtaining intermittent motion, a rotating driving element, a driven element, said elements having coacting surfaces and the path of movement of the coacting surfaces of the driver coinciding with part of the coacting surfaces of the driven member during a dwell in the movement of the driven element.

11. In a mechanical movement device, a driving member having a plurality of driving elements, and a driven member formed with a series of teeth each adapted for operative engagement by said driving elements and having diametrically opposite concentric outer portions, each of said teeth being contracted in width intermediate its ends.

12. In a mechanical movement device, a driving member having a plurality of driving elements, and a driven member formed with a series of teeth each adapted for operative engagement by said driving elements and having diametrically opposite concentric outer portions adapted to assume concentric relation with the axis of movement of and to be simultaneously engaged by said driving elements, each of said teeth being contracted in width intermediate its ends.

13. In a mechanical movement device, a driving member having a plurality of driving elements, and a driven member formed with a series of teeth each adapted for operative engagement by said driving elements and having diametrically opposite concentric outer portions, portions of said teeth intermediate their ends being differently inclined in the same direction relative to diameters of the driven element passing through the respective teeth.

14. In a mechanical movement device, a driving member having a plurality of driving elements, and a driven member formed with a series of teeth each adapted for operative engagement by said driving elements and having diametrically opposite concentric outer portions, each of said teeth being contracted in width intermediate its ends and having straight edges in the contracted portions each parallel with the adjacent edge of the adjacent tooth.

15. In a mechanical movement device, a driving member having a plurality of eccentrically arranged cylindrical driving pins, and a driven member formed with a series of teeth each having its opposite edges intermediate the ends differently inclined in the same direction relative to a diameter passing through said tooth and equi-distant respectively from the adjacent edges of the adjacent teeth.

In testimony whereof, I have signed my name to this specification.

EDWARD B. ALLEN.